United States Patent [19]

Ricard et al.

[11] Patent Number: 5,524,407

[45] Date of Patent: Jun. 11, 1996

[54] MODULAR SHUTTER AND RETENTION ASSEMBLY

[75] Inventors: Michael J. Ricard, Prospect Heights; Dave Bures, West Dundee, both of Ill.; Alan MacGowan, Walworth; Leroy Pohl, Elkhorn, both of Wis.; Steve Schreiner, Woodstock; John Wenzlaff, Wonder Lake, both of Ill.

[73] Assignee: Selfix, Inc., Chicago, Ill.

[21] Appl. No.: 304,372

[22] Filed: Sep. 12, 1994

[51] Int. Cl.⁶ .................................................. E06B 7/08
[52] U.S. Cl. ........................... 52/473; 52/586.2; 403/331; 403/363; 403/381
[58] Field of Search ........................... 52/473, 586.2; 403/331, 335, 336, 338, 363, 381

[56] References Cited

U.S. PATENT DOCUMENTS

| | | | |
|---|---|---|---|
| 2,102,156 | 12/1937 | Kalb, Sr. | 20/63 |
| 2,484,769 | 10/1949 | Wolters | 160/107 |
| 2,835,001 | 5/1958 | Matthews | 20/63 |
| 3,055,467 | 9/1962 | Peek et al. | 189/54 |
| 3,086,442 | 4/1963 | Waldron | 98/121 |
| 3,191,242 | 6/1965 | Rauen | 20/63 |
| 3,364,643 | 1/1968 | Smith et al. | 52/455 |
| 3,455,079 | 7/1969 | Frederick | 52/473 |
| 3,548,555 | 12/1970 | Trostle et al. | 52/473 |
| 3,802,146 | 4/1974 | Tacke et al. | 52/624 |
| 3,932,959 | 1/1976 | Jansons et al. | 49/75 |
| 3,936,985 | 1/1976 | Marulli | 52/98 |
| 3,968,738 | 7/1976 | Matzke | 98/108 |
| 4,020,609 | 5/1977 | Daniels | 52/507 |
| 4,023,320 | 5/1977 | Jackson | 52/473 |
| 4,251,966 | 2/1981 | Foltman | 52/309.1 |
| 4,381,633 | 5/1983 | MacLeod | 52/473 |
| 4,765,110 | 8/1988 | MacLeod | 52/473 |
| 4,858,400 | 8/1989 | Foyt | 52/98 |
| 4,939,880 | 7/1990 | Wang | 52/473 |
| 5,060,442 | 10/1991 | Chubb | 52/473 |
| 5,152,116 | 10/1992 | MacGowan | 52/473 |
| 5,163,260 | 11/1992 | Ricard et al. | 52/473 |
| 5,265,391 | 11/1993 | Ricard et al. | 52/455 |

FOREIGN PATENT DOCUMENTS

| | | |
|---|---|---|
| 2257771 | 8/1975 | France . |
| 2055940A | 3/1981 | United Kingdom . |

Primary Examiner—Carl D. Freidman
Assistant Examiner—Aimee E. McTigue
Attorney, Agent, or Firm—Dressler, Goldsmith, Shore & Milnamow

[57] ABSTRACT

A shutter and retention assembly of modular members molded or extruded from a polymeric material includes a pair of side rails, each side rail having a front wall, an outer wall and an inner wall. The inner wall includes a retaining channel formed therein. The shutter further includes a shutter panel member having a central portion and a pair of runners extending along the sides thereof. Each of the runners includes a projection extending along at least a portion thereof. The projection has a cross-sectional shape complementary to the retaining channel of the side rails for securing the panel member to the side rails. The complementary shapes of the engaged projections and retaining channels resist disengagement of the side rails from the panel member.

11 Claims, 3 Drawing Sheets

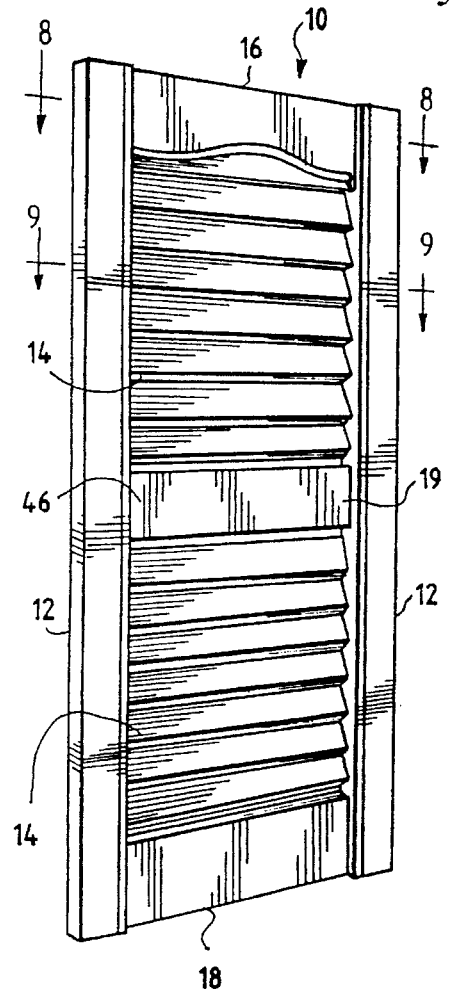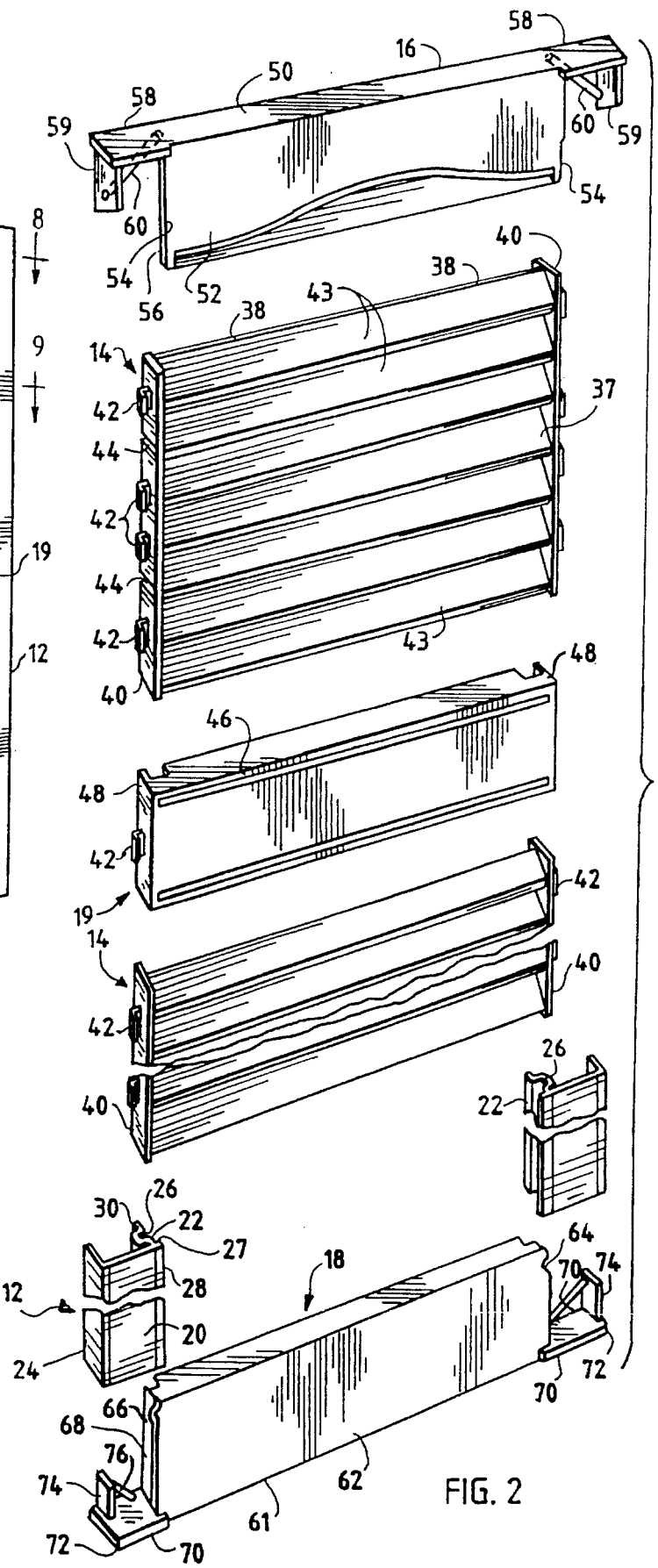
FIG. 1
FIG. 2

MODULAR SHUTTER AND RETENTION ASSEMBLY

FIELD OF THE INVENTION

This invention pertains to building shutters, and more particularly to adjustable modular shutters and retention assemblies.

BACKGROUND OF THE INVENTION

A variety of decorative building shutters are available for installation adjacent to openings in buildings, such as windows. Such shutters are constructed from various materials, including wood, metal, and polymeric materials such as styrene and polypropylene.

Many of the shutters currently available are constructed as pre-sized integral units. One difficulty with such integral unit shutters is that many building openings, such as windows, are not always standard or uniform sizes. Therefore, integral, unitary shutters often do not match the requirements of a particular window or opening.

Shutters are available which are assembled from modular components in a range of sizes. Therefore, such modular shutters are easily tailored for particular installations.

Examples of such modular shutters are disclosed in U.S. Pat. No. 4,251,966 to Foltman, entitled "Adjustable Height Shutter", U.S. Pat. No. 5,152,166 to MacGowan, entitled "Modular Shutter Assembly", and U.S. Pat. No. 5,265,391 to Ricard et al., entitled "Stabilized Modular Shutter", all of which patents are assigned to the assignee of this application. Other examples of modular shutters are disclosed in U.S. Pat. No. 4,765,110 to MacLeod, entitled "Adjustable Plastic Shutter" and U.S. Pat. No. 5,060,442 to Chubb, entitled "Louvered Plastic Building Product."

Typically, modular shutters have a pair of side rails, a central shutter panel which, for example, may be planar or louvered, and top and bottom end rails. Generally, the side rails are cut to meet the particular size requirements of the shutter installation. The shutter panels are cut or sized accordingly. The width of modular shutters can be adjusted by use of shutter panels, end rails and mullions of different dimensions.

In some configurations, one or more central rails or mullions may be disposed between multiple shutter panels in the central portion of the shutter. Mullions may be used to provide additional rigidity to the shutter structure, and to alter the appearance of the shutter assembly.

Typically, the components of many existing modular shutters are molded and/or extruded from a plastic such as styrene or polypropylene. Styrene is a relatively rigid, easily molded and extruded material. Polypropylene is less rigid than styrene, but is also relatively easily molded and extruded.

Styrene shutters can be painted after they are assembled. Polypropylene shutters, on the other hand, can be molded or extruded in various colors to eliminate the subsequent step of painting.

In many existing modular shutters, each shutter panel has a pair of runners extending along the opposite sides of the panel, transverse to the plane of the shutter panel. Typically, each of the side rails of such modular shutters has a channel formed on the inner wall thereof to slidably receive the runners of the shutter panel.

In the aforementioned Foltman patent, the shutter panel runner is received in a flat, planar track formed on the inner wall of the side rail by a rear hook portion and a front generally flat lip.

Another example of a shutter having a flat, planar track to engage the shutter panel runner is shown in the aforementioned patent to MacLeod. The shutter disclosed in the MacLeod patent has a side rail track which includes two hook portions, one on the front of the side rail and one on the rear of the side rail.

Problems have been observed during assembly of such shutters, particularly shutters formed of polypropylene, due to the relative flexibility of the material. The runners of the shutter panel tend to disengage from the channel or track portions of the side rails when the shutter components are flexed, (i.e., bent concave or convex relative to the front of the shutter) to any appreciable extent.

In the existing shutters, such as those disclosed in the Foltman and MacLeod patents, only the front and rear edges of the runners are engaged by the tracks or channels formed on the side rails. These locations appear to be the positions of maximum deflection and distortion. Such distortion may allow the forward or back edge of the runners on the shutter panels, the mullions, and/or the end rails to escape from the track to permit separation of these components from the assembly.

Furthermore, the effectiveness of restraints provided at the front and back extremities of the various channel and track configurations on the side rails of existing shutter assemblies to retain the runners of the other components is often less than desired. This appears to be not only because of the location of the restraints (at positions of maximum deflection), but also because the limited interaction between runners and the tracks does not effectively prevent undesired separation thereof during assembly.

Disengagement of the runners from the side rails makes assembly of the shutters difficult, and tends to increase assembly time and cost thereof.

It would be desirable, therefore, to provide a shutter having the advantages of a modular design, while incorporating a shutter panel to side rail engagement configuration that would provide improved resistance to disengagement of the shutter panels and other components from the side rails during assembly.

SUMMARY OF THE INVENTION

A modular shutter and retention assembly in accordance with the present invention incorporates side rails and shutter panel runners in which the side rail retaining tracks and the shutter panel runners are configured and interact to restrict and limit separation and disengagement of the various components of the modular shutter and retention assembly resulting from, for example, distortion and deflection thereof during assembly.

A modular shutter and retention assembly incorporating the present invention resolves this disengagement problem by providing an engagement configuration which accommodates forces that occur when the components are flexed during assembly. Such a configuration includes an offset retaining channel assembly configured so that the side rails engage the runner portions of other components at locations displaced from the point of maximum deflection, and offset from the plane of the runner.

The modular shutter and retention assembly in accordance with the present invention appears to generate multidirectional retaining forces during assembly and thus improves the resistance against disengagement (i.e., achieves a secure engagement) of the side rails and other components, such as shutter panels.

In one embodiment of a modular shutter and retention assembly incorporating the present invention, each of the shutter side rails includes a retaining channel which is formed as a part of, and is offset and generally transverse to the plane of the side rail inner wall. Such a retaining channel is preferably located intermediate the front and rear edges of the side rail inner wall. The retaining channel has a retention enhancing shape, such as, for example, an L-shaped cross-section.

The runners on the shutter panels and selected other components include one or more projections having a shape complementary to the shape of the aforementioned retaining channels. The projections are offset from the plane of the runner, and are located intermediate the front and rear edges thereof for engagement with the retaining channels.

A modular shutter and retention assembly embodying the present invention includes a pair of side rails, at least one shutter panel member, and top and bottom end rails. When there are multiple shutter panels, there may also be one or more mullion members disposed between the shutter panels.

Each side rail has a front wall, an inner wall, and an outer wall. The pair of side rails are spaced apart one from the other and oriented in generally parallel planes. Each of the side rail inner walls includes a retaining channel therein having a retention enhancing shape.

Each shutter panel member is disposed between, and secured to, the side rails. The panel member has a central or shutter panel, which may include louvers, and a pair of runner portions disposed along the sides of the shutter panel. The runner portions are oriented generally transverse to the plane of the shutter panel.

Each of the runner portions has one or more projections extending therefrom, generally transverse thereto. Each of the projections has a retention enhancing shape which is complementary to the retention enhancing shape of the retaining channel. In one embodiment, each of the projections includes an enlarged transverse portion. The projections are received in the retaining channels when the shutter panels and the side rails are assembled, with each projection and corresponding retaining channel being engageable one with the other to secure the panel members to each of the side rails. The top and bottom end rails, which are disposed at either end of the panel member for enclosing the panel member, are slidably receivable in the side rails.

The modular shutter and retention assembly incorporating the present invention may be formed with retaining channels and projections having a number of different complementary retention enhancing shapes, such as, for example, spherical or oval shaped enlargements (bead-like) formed at selected points along the length thereof, arrowhead shaped cross-sections, and dove-tail shaped cross-sections.

The complementary retention enhancing projections and channels are intended to increase the resistance of the assembled components against undesired inadvertent separation. The retention enhancing projections and channels are located away from the position of maximum deflection, and the shapes thereof are selected in an effort to take advantage of multidirectional retaining forces when the components are deflected and distorted during assembly.

Numerous other advantages and features of the present invention will become readily apparent from the following detailed description of the invention and embodiments thereof, from the claims, and from the accompanying drawings in which the details of the invention are fully and completely disclosed as a part of the specification.

BRIEF DESCRIPTION OF THE DRAWINGS

FIG. 1 is a perspective view of a modular shutter and retention assembly which embodies the principles of the present invention;

FIG. 2 is an enlarged, exploded, perspective view of the modular shutter and retention assembly of FIG. 1;

DETAILED DESCRIPTION OF PREFERRED EMBODIMENTS

Figure 3:
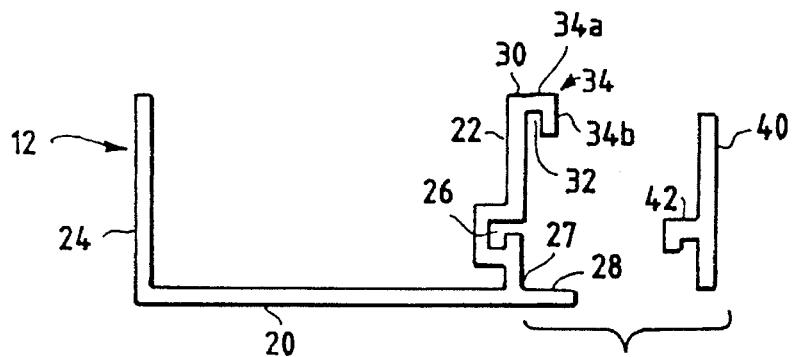
FIG. 3 is an enlarged, fragmentary, sectional view taken along line 3—3 of FIG. 1 in a direction indicated by arrows, and shows one embodiment of the retaining channel and projection forming part of the modular shutter and retention assembly incorporating the present invention.

While this invention is susceptible of embodiment in many different forms, there is shown in the drawings and will be described herein in detail, specific embodiments thereof with the understanding that the present disclosure is to be considered an exemplification of the principles of the invention and is not intended to limit the invention to the specific embodiments illustrated.

There is shown in FIG. 1 a modular shutter and retention assembly 10 comprising a pair of side rails 12, one or more shutter panel members 14, a top end rail 16, and a bottom end rail 18. When, as shown in FIG. 2, the shutter and retention assembly 10 includes more than one shutter panel member 14 a mullion or central rail 19 may be disposed between adjacent panel members 14.

With reference to FIGS. 2 through 7, each side rail 12 has a front wall 20, an inner side wall 22, and an outer side wall 24. A retaining channel 26 or retaining slot is formed in the inner wall 22 of each side rail 12. The retaining channel 26 may take a number of shapes, as shown in FIGS. 3 through 7, which shapes will be further described herein.

The retaining channel 26 shown in FIG. 3, has an L-shaped cross-section. The channel 26 interrupts the inner wall 22 at a location intermediate the front end 27 of the inner wall 22 at a retaining lip 28 and the rear end 30 of inner wall 22. The retaining channel 26 is offset from, and interrupts, the plane of the inner wall 22. The inner wall 22 further includes a mounting channel or track 32 defined by the retaining lip 28 and a reentrant flange or hook portion 34 having a base leg 34a extending inwardly from the inner wall 22, and a side leg 34b extending from the base leg 34a.

Figure 4:
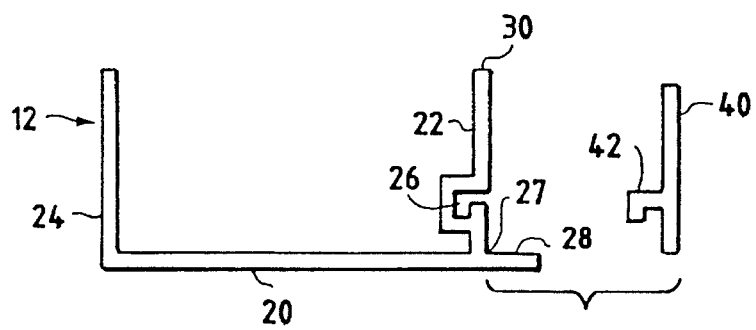
FIG. 4 is a view similar to FIG. 3 showing an alternate embodiment of a modular shutter and retention assembly incorporating the present invention.

The embodiment illustrated in FIG. 4 is substantially like what is shown in FIG. 3, except that the inner wall 22 does not include a mounting channel such as the mounting channel 32 illustrated in FIG. 3.

The shutter panel member 14 has a central portion 37, and includes a pair of runners or mounting flanges 40, which extend along the opposite sides thereof and run the length thereof. The runners 40 are oriented generally transverse to the plane of the central portion 37.

Each of the runners 40 includes a plurality of discontinuous, aligned projections 42. The projections 42 are located at spaced locations along the length of the runners 40, and extend out from the surface thereof. The discrete, discontinuous projections facilitate separation of the panels 14 into shorter lengths according to the requirements of the particular installation. Alternatively, the projections 42 may take the form of a single, continuous projection (not shown) which extends along the length of the runner 40.

Figure 5:
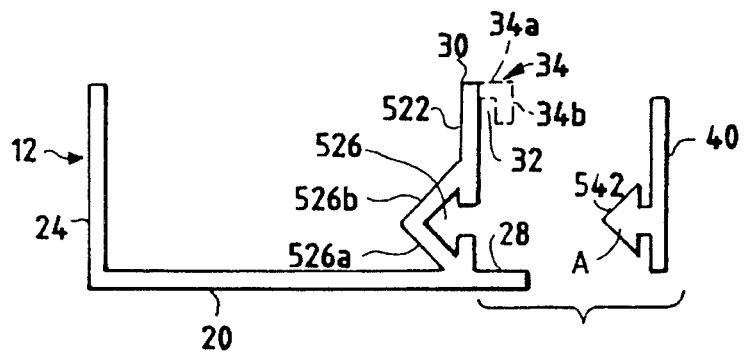
FIG. 5 is a view similar to FIG. 4 showing yet another embodiment of a modular shutter and retention assembly incorporating the present invention.
Figure 6:
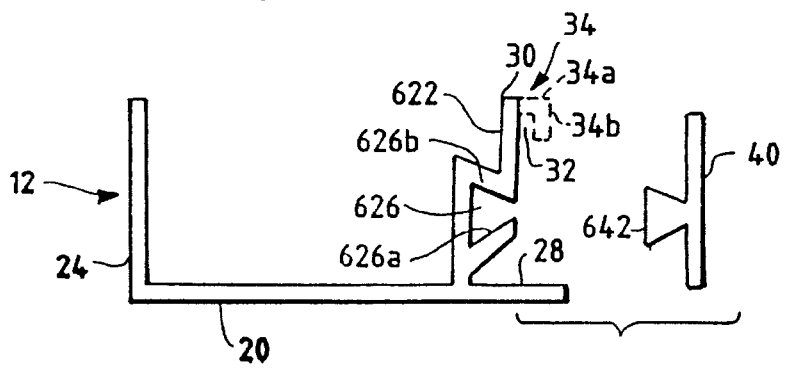
FIG. 6 is a view similar to FIG. 3 showing still another embodiment of the modular shutter and retention assembly of the present invention.
Figure 7:
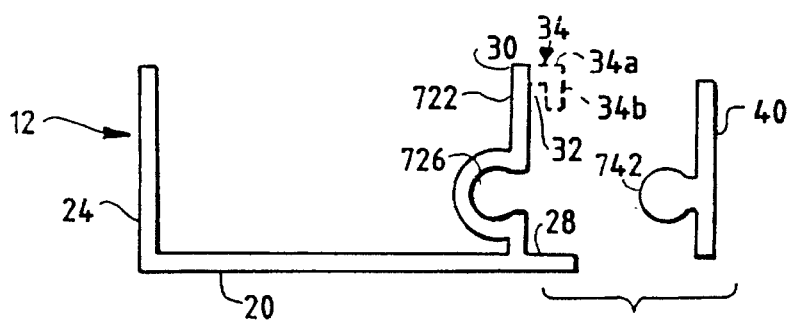
FIG. 7 is a view similar to FIG. 3 showing a further embodiment of a modular shutter and retention assembly incorporating the present invention.
Figure 8:
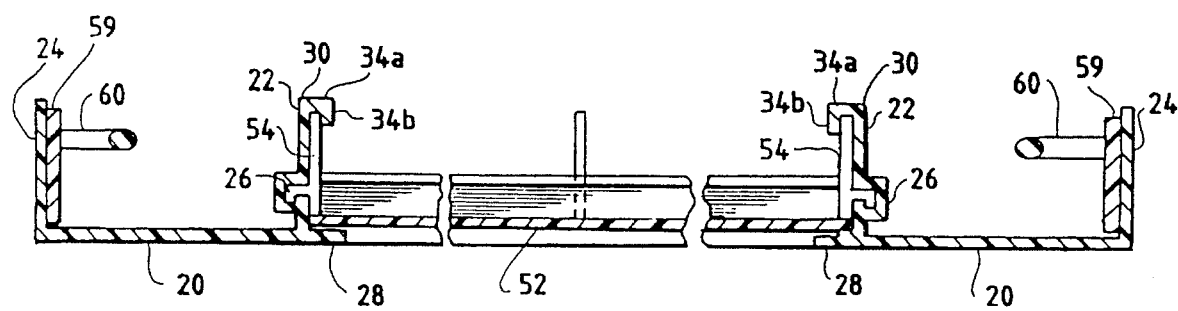
FIG. 8 is a cross-sectional view taken along line 8—8 of FIG. 1 in a direction indicated by arrows.
Figure 9:
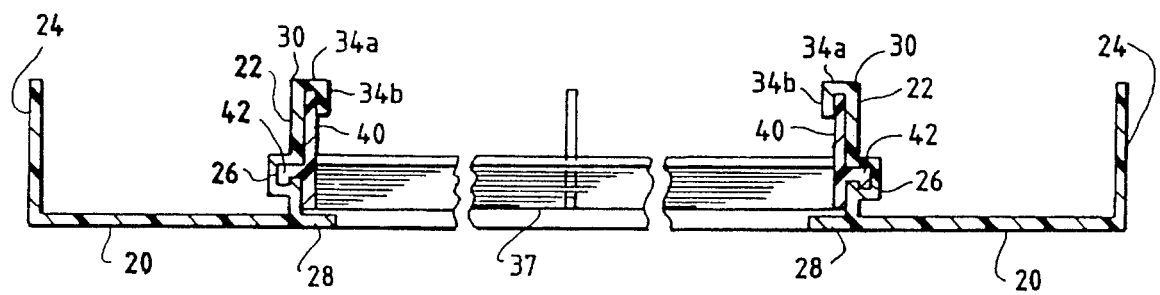
FIG. 9 is a cross-sectional view taken along line 9—9 of FIG. 1 in a direction indicted by arrows.

The channel 26 and the projections 42 may take a number of complementary shapes. For example, the projections 42 and channel 26 shown in FIGS. 3 and 4 have an L-shaped cross-section. Other exemplary complementary configurations are shown in FIGS. 5–7.

In the configurations shown in FIGS. 3–7, the projections include an enlarged transverse portion along the length thereof, as described below.

The shutter panel member 14 may be formed by a plurality of louvers 43, as shown in FIGS. 1 and 2. Alternatively, the panel 14 may be formed as a solid, non-louvered panel (not shown).

The runners 40 of the louvered panel 14 further include score lines 44 or other frangible means to facilitate separation of the panels 14 into shorter lengths according to the requirements of the particular installation. The score lines 44 are formed in each runner 40, at selected locations (e.g., between the louvers 43), and extend transverse to the length thereof.

The mullion 19 includes a pair of runners or mounting flanges 48 having projections 42 extending therefrom similar in construction to the runners 40 and projections 42 of the shutter panel 14.

The top rail 16 of the shutter and retention assembly 10, which may be of standard construction, has a top wall 50 and a front wall 52. A pair of flat runners or mounting flanges 54 extend rearwardly from the front wall 52 and extend along the length thereof. The top rail runners 54 engage the retaining lip 28 and a reentrant flange or hook portion 34 of mounting channel or track 32 of the side rails 12.

The top wall 50 of the top rail 16 further extends past the runners 54 to define a pair of wing-like extensions 58 from which depend flange portions 59. A pair of angled braces 60 extend between the top wall wing-like extensions 58 and the flange portions 59 to provide additional rigidity to the structure.

The bottom rail 18 of the shutter and retention assembly is constructed in a manner similar to the top rail 16. The bottom rail has a bottom wall 61, a front wall 62 and a pair of runners or mounting flanges 66 extending rearwardly therefrom along the length thereof. The flat runners 66 of the bottom rail 18 are similar to the runners 54 of the top rail 16 and engage the retaining lip 28 and a reentrant flange or hook portion 34 of mounting channel or track 32 of the side rails 12.

The bottom rail 18 further includes a pair of wing-like extensions 70 and upstanding flange portions 74. A pair of angled braces 76 extend between the wing-like extensions 70 and the flange portions 74, to provide additional rigidity to the structure.

FIGS. 5 through 7 illustrate alternative embodiments of the retaining channels and projections forming part of the shutter and retention assembly 10 incorporating the present invention. In each of FIGS. 5–7, the hook portion 34 of mounting channel 32 may be omitted as indicated by broken or dashed lines.

In FIG. 5, the retaining channel 526 has an arrowhead configuration and the projection 542 has a complementary arrowhead shape. The retaining channel 526 interrupts, and is formed in, the inner wall 522 of the side rail 12.

The retaining channel 526 includes a pair of angled walls 526a and 526b, which extend outwardly from the inner wall 522. As indicated above, the inner wall 522 may include or omit a hook portion 34 of mounting channel 32 of similar construction to that shown in FIG. 3.

FIG. 6, shows a dovetail-shaped retaining channel 626 and a complementary dovetail-shaped projection 642. The channel 626 interrupts, and is formed in, the inner wall 622 of the side rail 12.

The retaining channel 626 includes a first inwardly extending wall 626a and a second inwardly extending wall 626b. The inner wall 622 extends rearwardly from wall 626b and may include or omit a hook portion 34 of mounting channel 32 formed integral therewith, similar to that shown in FIG. 3.

FIG. 7 shows yet another embodiment which includes a curvilinear or bead-like retaining channel 726 and a complementary bead-like projection 742. The bead-like retaining channel 726 interrupts, and is formed in an the inner wall 722. The bead-like configuration may be formed in a circular or elongated cross-sectional shape.

The inner wall 722 may include or omit a hook portion 34 of a mounting channel 32, formed similar to that shown in FIG. 3.

In assembling the shutter and retention assembly 10, the side rails 12 are measured and cut to size for the particular installation. One or more shutter panels 14, one or more mullions or central rails 19, a top end rail 16 and a bottom end rail 18 are assembled to the side rails 12.

Each side rail 12 is inserted onto a bottom end rail 18. The bottom end rail 18 and side rails 12 are assembled such that the runners 66 of the bottom rail are received in the mounting channel 32 of the side rails 12.

The upwardly extending flange portion 74 of the bottom rail 18 is disposed interior of the side rail 12. That is, the flange portion 74 is interior of the side rail 12, adjacent the outer wall 24 thereof. When viewed from the front or side of the shutter and retention assembly 10, the outer wall 24 of the side rail and the outwardly extending wing-like portion 72 of the bottom rail are exposed to view.

The side rails 12 and the bottom rail 16 can be fastened one to the other by suitable fastening means, such as by stapling, through the inner wall 22 and the runner 66 adjacent thereto. This secures the side rail 12 to the bottom rail 18.

Each shutter panel 14 is assembled to the side rails 12 by inserting the runners 40 of the shutter panels 14 into the mounting channels 32 of the side rails 12 and the projections 42, 542, 642 or 742, as the case may be, into the retention channels 26, 526, 626 or 726, respectively.

Any of the panels 14 can be shortened by separating a panel 14, at the score lines 44 or other frangible connection.

As indicated above, one or more mullions or central rails 19 can be inserted between adjacent shutter panels 14.

Although the hook portion 34 is not necessary, when present it permits the use of prior, in-stock mullions, top and bottom end rails which do not include the projections forming part of the shutter and retention assembly of the present invention. Thus, the existing shutter panel members and top and bottom rails can be utilized with side rails having retention channels, and allows for flexibility in utilizing parts from one shutter design in the assembly of other shutter designs. It is to be understood that the hook portion 34 is not required to practice the present invention.

Thus there has been disclosed modular shutter and retention assembly in which the side rail retaining tracks and the shutter panel runners are configured and interact to restrict and limit separation and disengagement of the various components of the modular shutter and retention assembly resulting from, for example, distortion and deflection thereof during assembly of the modular shutter and retention assembly.

A modular shutter and retention assembly incorporating the present invention resolves this disengagement problem by providing an engagement configuration which accommodates forces that occur when the components are flexed during assembly.

From the foregoing, it will be observed that numerous variations and modifications may be effected without departing from the true spirit and scope of the novel concept of the present invention. It is to be understood that no limitation with respect to the specific embodiments illustrated herein is intended or should be inferred. It is, of course, intended to cover by the appended claims all such modifications as fall within the scope of the appended claims.

What is claimed is:

1. A modular shutter and retention assembly comprising:
a pair of side rails, a panel member disposed between and secured to said side rails, and a pair of end rails secured to said side rails and disposed at either end of the panel member for enclosing the panel member;
each of said side rails having a front wall, a generally planar inner wall, and an outer wall, said side rails being spaced apart one from the other with the inner walls facing each other and lying in generally parallel planes, each of the inner walls defining a retaining channel therein, with at least a portion of each of said retaining channels being offset from the plane of the inner wall;
said panel member having a central portion and a pair of runner portions disposed along the sides thereof, the runner portions being oriented generally parallel to the inner walls of said side rails, each of the runner portions having a projection extending out therefrom, the projections each having a shape complementary to the shape of the retaining channel, each of said projections and one of said retaining channels being slidably engagable in close fitting relationship one with the other to secure said panel member to each of said side rails and resist separation thereof; and
said pair of end rails being slidably receivable in the side rails and having a generally planar front portion, outer end wall portions, and inner end wall portions disposed adjacent the panel member.

2. The modular shutter and retention assembly as claimed in claim 1, wherein the retaining channel and said projection are generally L-shaped in cross-section.

3. The modular shutter and retention assembly as claimed in claim 1, wherein each projection is formed as a continuous member along the length of each runner.

4. The modular shutter and retention assembly as claimed in claim 1 wherein said projection and said retaining channel include enlarged transverse portions shaped complementarily with respect to one another.

5. A modular shutter and retention assembly comprising:
a pair of side rails, each side rail having a front wall, an inner wall, and an outer wall, said pair of side rails being spaced apart one from the other with the inner walls facing each other and oriented in generally parallel planes, each of said inner walls having a retaining channel formed therein intermediate the front and rear ends thereof;
a panel member disposed between said side rails, said panel member having a central portion and a pair of runner portions disposed along the sides thereof, said runner portions being oriented parallel to said side rail inner walls and being disposed adjacent thereto, each of said runner portions having a projection extending therefrom, said projections each slidably engaging a retaining channel formed in said adjacent side rail inner wall, said projections and retaining channels being disposed in close fitting relationship with one another for providing multidirectional resistance to disengagement of the runner portion from its respective side rail inner wall; and
a pair of end rails slidably receivable in the side rails, the end rails being disposed at either end of the panel member for enclosing the panel member, the end rails having a generally planar front portion, outer end wall portions, and inner end wall portions disposed adjacent the panel member.

6. A modular shutter and retention assembly comprising:
a pair of side rails, each side rail having a front wall, a generally planar inner wall, and an outer wall, said pair of side rails being spaced apart one from the other with said inner walls facing each other and being oriented in generally parallel planes, each of said side rails having a retaining channel formed therein offset from the plane of said inner wall;
a panel member disposed between said side rails, the panel member having a central portion and a pair of runner portions disposed along the sides thereof, said runner portions being oriented parallel to their respective side rail inner walls, each runner portion having a projection extending therefrom being complementary in shape to one of said retaining channels, each said projection slidably engaging its respective side rail retaining channel in close firing relationship therein for providing multidirectional resistance to disengagement of the runner portion from its respective side rail; and
a pair of end rails receivable in the side rails, the end rails being disposed at either end of the panel member for enclosing the panel member and said side rails, said end rails having a generally planar front portion, outer end wall portions, and inner end wall portions disposed adjacent the panel member.

7. The modular shutter and retention assembly as claimed in claim 6 wherein said projection and said retaining channel have enlarged transverse portions shaped complementarily with respect to one another.

8. A modular shutter and retention assembly comprising:
a pair of side rails, a panel member disposed between and secured to said side rails, and a pair of end rails secured to said side rails and disposed at either end of the panel member for enclosing the panel member;

each of said side rails having a front wall, a generally planar inner wall, and an outer wall, said side rails being spaced apart one from the other with the inner walls facing each other and lying in generally parallel planes, each of the inner walls defining a retaining channel therein, with at least a portion of each of said retaining channels being offset from the plane of the inner wall and with said retaining channels being generally curvilinear in cross-section;

said panel member having a central portion and a pair of runner portions disposed along the sides thereof, the runner portions being oriented generally parallel to the inner walls of said side rails, each of the runner portions having a projection extending out therefrom, the projections each having a curvilinear cross-sectional shape complementary to the cross-sectional shape of the retaining channel, each of said projections and one of said retaining channels being slidably engagable one with the other to secure said panel member to each of said side rails and resist separation thereof; and said pair of end rails being slidably receivable in the side rails and having a generally planar front portion, outer end wall portions, and inner end wall portions disposed adjacent the panel member.

9. A modular shutter and retention assembly comprising:

a pair of side rails, a panel member disposed between and secured to said side rails, and a pair of end rails secured to said side rails and disposed at either end of the panel member for enclosing the panel member;

each of said side rails having a front wall, a generally planar inner wall, and an outer wall, said side rails being spaced apart one from the other with the inner walls facing each other and lying in generally parallel planes, each of the inner walls defining a retaining channel therein, with at least a portion of each of said retaining channels being offset from the plane of the inner wall and with said retaining channels defining an arrow-head shape in cross-section;

said panel member having a central portion and a pair of runner portions disposed along the sides thereof, the runner portions being oriented generally parallel to the inner walls of said side rails, each of the runner portions having a projection extending out therefrom, the projections each having an arrow-head shape in cross-section complementary to the cross-sectional shape of the retaining channel, each of said projections and one of said retaining channels being slidably engagable one with the other to secure said panel member to each of said side rails and resist separation thereof; and said pair of end rails being slidably receivable in the side rails and having a generally planar front portion, outer end wall portions, and inner end wall portions disposed adjacent the panel member.

10. A modular shutter and retention assembly comprising:

a pair of side rails, a panel member disposed between and secured to said side rails, and a pair of end rails secured to said side rails and disposed at either end of the panel member for enclosing the panel member;

each of said side rails having a front wall, a generally planar inner wall having a front edge, and an outer wall, said side rails being spaced apart one from the other with the inner walls facing each other and lying in generally parallel planes, each of the inner walls defining a retaining channel therein, with at least a portion of each of said retaining channel being offset from the plane of the inner wall;

said panel member having a central portion and a pair of runner portions disposed along the sides thereof, the runner portions being oriented generally parallel to the inner walls of said side rails and the runner portions each defining a front edge and a rear edge, the front edge of each runner portion being disposed adjacent the front edge of the inner side wall of one of said side rails, each of the runner portions having a projection extending out therefrom intermediate the front edge and the rear edge of each said runner portion, the projections each having a shape complementary to the shape of the retaining channel, each of said projections and one of said retaining channels being engagable one with the other to secure said panel member to each of said side rails and resist separation thereof; and said pair of end rails being slidably receivable in the side rails and having a generally planar front portion, outer end wall portions, and inner end wall portions disposed adjacent the panel member.

11. A modular shutter and retention assembly comprising:

a pair of side rails, a panel member disposed between and secured to said side rails, and a pair of end rails secured to said side rails and disposed at either end of the panel member for enclosing the panel member;

each of said side rails having a front wall, a generally planar inner wall having a front edge and a rear edge, and an outer wall, said side rails being spaced apart one from the other with the inner walls facing each other and lying in generally parallel planes, each of the inner walls defining a retaining channel therein, with at least a portion of each of said retaining channels being offset from the plane of the inner wall;

each of said side rails having a mounting channel formed therein, the mounting channels each including a hook portion disposed adjacent the rear edge of one of said inner side walls, each inner wall including an inwardly extending lip adjacent the front edge thereof;

said panel member having a central portion and a pair of runner portions disposed along the sides thereof, the runner portions being oriented generally parallel to the inner walls of said side rails, each of the runner portions having a projection extending out therefrom, the projections each having a shape complementary to the shape of the retaining channel, each of said projections and one of said retaining channels being engagable one with the other to secure said panel member to each of said side rails and resist separation thereof; and said pair of end rails being slidably receivable in the side rails and having a generally planar front portion, outer end wall portions, and inner end wall portions disposed adjacent the panel member.

* * * * *